(12) United States Patent
Manzini (10) Patent No.: US 7,213,841 B2
(45) Date of Patent: May 8, 2007

(54) STABILIZER SUPPORT SYSTEM (76) Inventor: Christopher J. Manzini, 15029 Randall La., Williamsport, MD (US) 21795

( * ) Notice: Subject to any disclaimer, the term of this patent is extended or adjusted under 35 U.S.C. 154(b) by 328 days.

(21) Appl. No.: 10/780,560

(22) Filed: Feb. 19, 2004

(65) Prior Publication Data
US 2004/0187727 A1 Sep. 30, 2004

Related U.S. Application Data (60) Provisional application No. 60/456,962, filed on Mar. 25, 2003.

(51) Int. Cl.
*B60S 9/02* (2006.01)
(52) U.S. Cl. .............................. 280/763.1; 280/764.1; 280/766.1; 212/302
(58) Field of Classification Search ............ 280/763.1, 280/764.1, 765.1, 766.1, 755, 6.15, 6.153; 212/301, 302; 105/72.2, 164, 163.1; 180/209
See application file for complete search history.

(56) References Cited

U.S. PATENT DOCUMENTS

| | | | |
|---|---|---|---|
| 2,121,922 A | 6/1938 | Nampa | |
| 2,311,304 A | 2/1943 | Lehti et al. | |
| 2,630,766 A | 3/1953 | Wunsch | |
| 2,965,046 A * | 12/1960 | Chambers | 105/72.2 |
| 3,434,432 A * | 3/1969 | Seifert | 105/72.2 |
| 3,716,252 A * | 2/1973 | Johnson | 280/766.1 |
| 4,048,925 A | 9/1977 | Storm | |
| 4,068,762 A | 1/1978 | Kennard et al. | |
| 4,111,316 A * | 9/1978 | Wappler | 414/550 |
| 4,222,332 A | 9/1980 | Newman | |
| 4,240,354 A | 12/1980 | Newman | |
| 4,276,985 A | 7/1981 | Newman | |
| 4,421,242 A * | 12/1983 | Brueske | 212/325 |
| 4,461,490 A * | 7/1984 | Fritel et al. | 280/763.1 |
| 4,700,851 A | 10/1987 | Reeve et al. | |
| 4,708,066 A | 11/1987 | Heckman | |
| 5,103,740 A * | 4/1992 | Masse | 105/72.2 |
| 5,289,780 A | 3/1994 | Bounds | |
| 5,387,071 A * | 2/1995 | Pinkston | 414/563 |
| 5,660,115 A * | 8/1997 | Shimon et al. | 105/72.2 |
| D413,290 S * | 8/1999 | Hinwood | D12/159 |
| 6,089,603 A * | 7/2000 | Ackley | 280/765.1 |
| 6,158,602 A | 12/2000 | Zakula et al. | |
| 6,230,911 B1 | 5/2001 | Zakula et al. | |
| 2002/0056694 A1 | 5/2002 | Rode et al. | |

* cited by examiner

*Primary Examiner*—Christopher P. Ellis
*Assistant Examiner*—John Walters
(74) *Attorney, Agent, or Firm*—Jeff E. Schwartz; Nixon Peabody LLP (57) ABSTRACT

The present invention relates to a stabilizer support system and a method for stabilizing or supporting heavy equipment in general. The system may comprise a support structure such as a conventional A-frame that is configured to support a crane or heavy equipment. The system and method are designed to provide an adapter to support the structure by distributing weight and load onto, for example, a rail or similar transportation system while still allowing movement of the structure along the rails or other transportation system.

63 Claims, 14 Drawing Sheets

STABILIZER SUPPORT SYSTEM

CROSS REFERENCE TO RELATED APPLICATIONS

This application claims the benefit, under 35 U.S.C. §119, of provisional U.S. Application Serial No. 60/456,962, filed 25 Mar. 2003, the entire contents and substance of which is hereby incorporated by reference.

FIELD OF THE INVENTION

The present invention relates to a stabilizer support system and a method for stabilizing or supporting heavy equipment in general. The system may comprise a support structure such as a conventional A-frame that is configured to support a crane or heavy equipment. The system and method are designed to provide an adapter to support the structure by distributing weight and load onto, for example, a rail or similar transportation system while still allowing movement of the structure along the rails or other transportation system.

BACKGROUND OF THE INVENTION

In industries, such as the railroad, for example, transporting machinery, supplies, and crews to limited access areas has been extremely difficult. Historically, there have generally been two methods for handling materials used for the railroad industry, such as rails, ties, other track material ("OTM") and ballast in order to bring it to limited access areas. Some examples of OTM are spikes, tie plates, rail anchors, and bolts. The first transport method has been by rail car. This method requires a great deal of coordination and can result in major delays due to the availability of cars, engines and/or locomotives. Even under optimum conditions, this method is only cost-effective if a large number of cars and/or materials are needed at the same time in approximately the same location.

The second method of transporting machinery, supplies, and crews to limited access areas has been by stockpiling at the nearest road location and reloading onto specialized hy-rail trucks or transporting with a front-end loader. This option is more commonly used, yet requires an available stockpiling area and/or double loading of the material. This method also requires extra equipment for the second loading and ties up specialized equipment.

Additionally, moving heavy materials requires extra support to prevent the loading vehicle or railway car from tipping during the loading process. To prevent such tipping, A-frame apparatus with support legs have been attached to the loading vehicle or railcar. The support legs are released in a downward direction and planted firmly on a ground surface to absorb the load force. Unfortunately this process takes a substantial amount of time because the support legs need to be resituated each time the loading vehicle or railcar is moved. Specifically, any time that the loading or carrier vehicle or car is moved, the support legs must be drawn up into the A-frame and then re-deployed when the loading or carrier vehicle or rail car are repositioned.

SUMMARY OF THE INVENTION

One embodiment of the present invention includes, for example, a railway support stabilizer system with a support frame and fit sleeves that are adapted to receive support legs. In one particular embodiment, the support frame is an A-frame. In another embodiment of the present invention, the support legs extend from a support frame. In an alternative embodiment, the support frame may be attached to any appropriate system, such as, for example, a railcar or a truck. In still another embodiment of the present invention, the invention is detachable.

In another embodiment of the present invention, the fit sleeves have a locking mechanism, which may include a bar channel, a bar tool, a pin, and/or one or more apertures. In one embodiment of the present invention, the fit sleeves are adapted to be attached to a load beam. In another embodiment, the load beam is supported by wheels. The wheels may, for example, be adapted for railway use or use on roadways or other flat surfaces, or surfaces of varying configurations. One embodiment of the present invention includes support legs with a flanged lower end. In this embodiment, the flange is adapted to slide into the fit sleeves. In another embodiment, a set of wheels may be attached beneath the fit sleeves to the load beam. In one embodiment, the wheels are rubber tires. In another embodiment, the invention includes tracks with or without treads, instead of tires. In one embodiment, the system includes hydraulics for added stabilization and to provide for further balance or a guard against overload conditions. In still another embodiment, the support legs may have wheels, tires, or rollers at their ends to facilitate movement on a surface.

One embodiment of the present invention includes a method for stabilizing a support system that includes providing a load beam with fit sleeves and extending support legs to rest on the load beam. Another embodiment of the present invention includes a method for stabilizing a support system that includes attaching a load beam with fit sleeves to a support structure, rotating the load beam upward, extending the support legs, sliding the fit sleeves under the support legs and locking the fit sleeves to the support legs. In this method the fit sleeves may be rotated upwards to receive the support legs, which may be extended to rest just above the fit sleeves. In another embodiment, a channel in the fit sleeves may slide along the support leg flange. Another embodiment of the present invention may include a method for distributing the weight on a support system by providing a load beam with fit sleeves and extending support legs to rest upon this structure. In this embodiment, a lift mechanism such as a channel and a channel tool may be used to properly orient the fit sleeves.

These and other features of the invention may be more fully understood by reference to the following drawings:

DETAILED DESCRIPTION OF THE INVENTION

It is to be understood that this invention is not limited to the particular methodology, protocols, and construction materials described herein and as such may vary. It is also to be understood that the terminology used herein is for the purpose of describing particular embodiments only, and is not intended to limit the scope of the present invention, which will be limited only by the appended claims.

As used herein and in the appended claims, the singular forms "a," "an," and "the" include plural reference unless the context clearly indicates otherwise. Thus, for example, reference to a "sleeve" is a reference to one or more such sleeves and includes equivalents thereof known to those skilled in the art, and so forth.

Unless defined otherwise, all technical and scientific terms used herein have the same meaning as commonly understood to one of ordinary skill in the art to which this invention belongs. Although any methods, devices, and materials similar or equivalent to those described herein can be used in the practice or testing of the invention, the preferred methods, devices and materials are now described.

Figure 1:
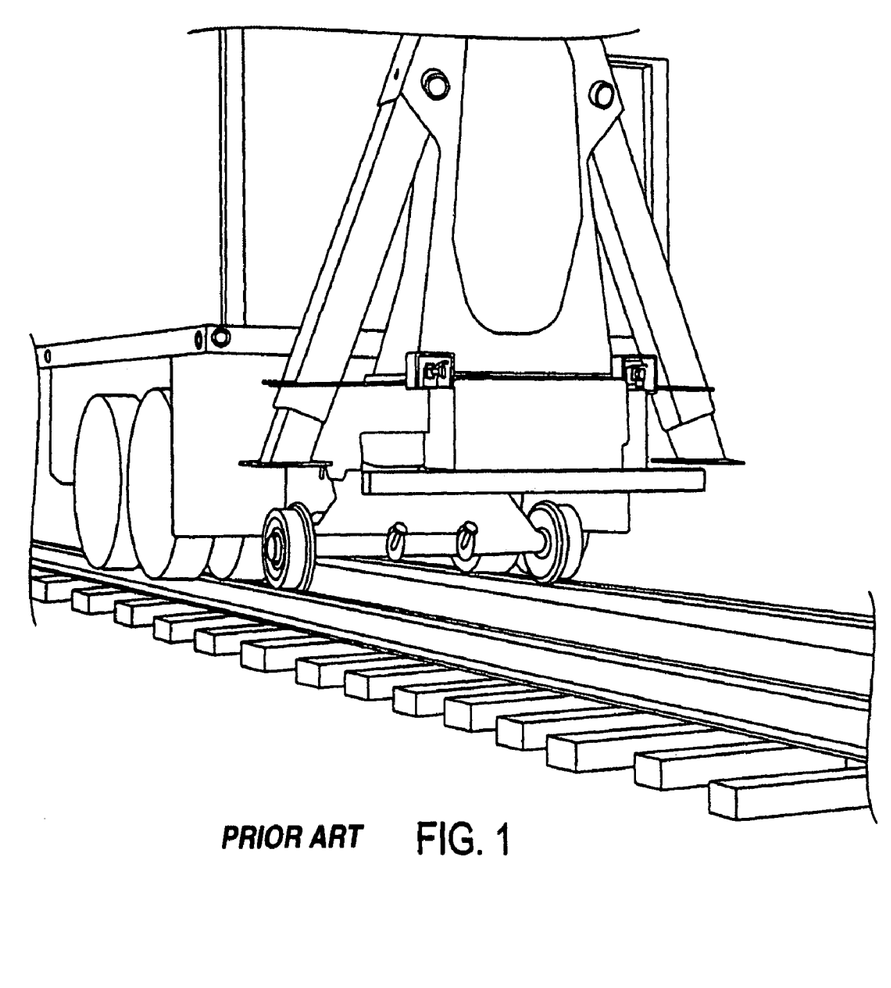
FIG. 1 depicts a view of a typical railway support system with the support structure in the storage position on a hy-rail truck.
Figure 2:
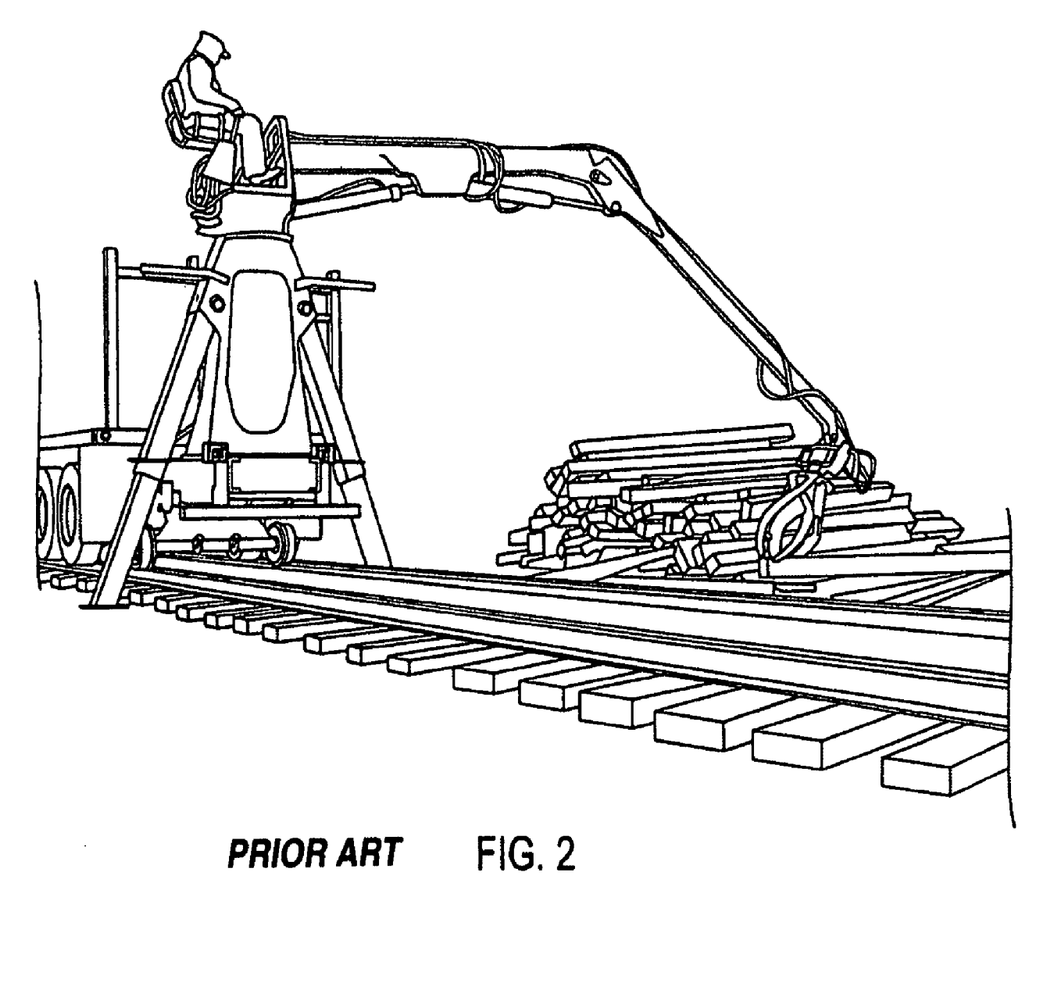
FIG. 2 depicts a view of a typical railway support system attached to an articulating boom.

FIG. 1 depicts a typical system for stabilizing a crane apparatus for lifting. This system utilizes a support structure, such as an A-frame apparatus attached to the rear of a vehicle, such as a hy-rail vehicle. Support legs are attached to the A-frame apparatus and can be released in a downward direction to help absorb the load and prevent tipping. FIG. 2 shows this apparatus in use. As shown, the support legs are deployed and contact the ground to balance the weight of the articulating boom and the material being lifted and/or loaded.

Figure 3:
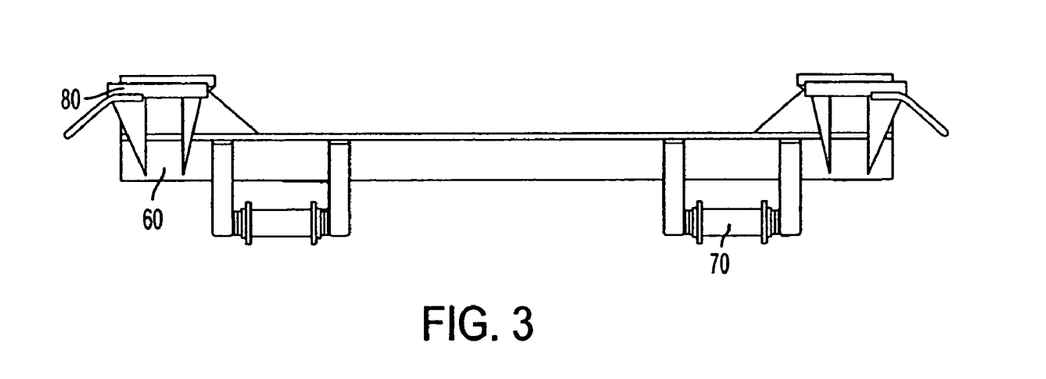
FIG. 3 depicts one embodiment of the present invention that is detached from a vehicle or railcar.
Figure 4:
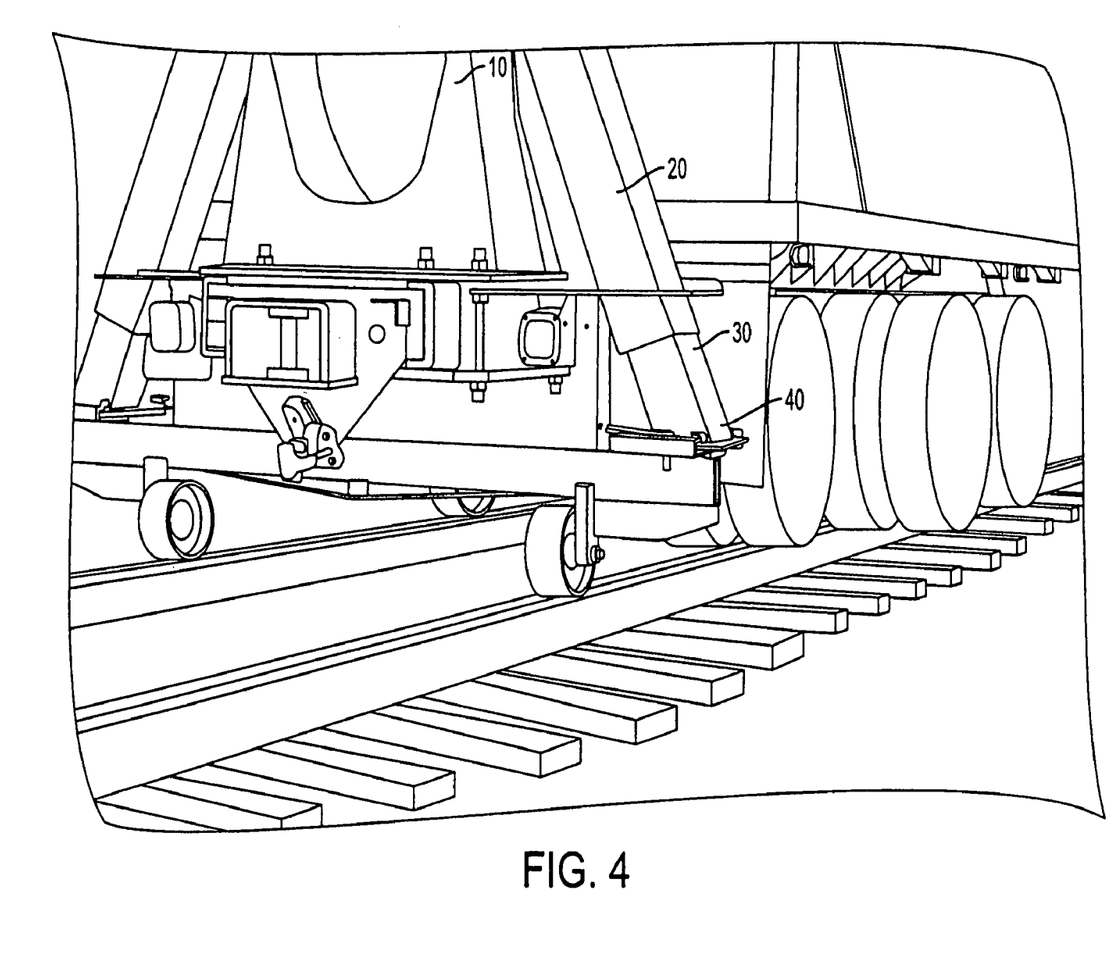
FIG. 4 depicts a rear angled view of an embodiment of the present invention.

FIG. 3 depicts one embodiment of the present invention. The adapter shown in FIG. 3 preferably includes a load beam 60 and fit sleeves 80. This adapter is designed to interact with a support structure. FIG. 4 depicts an embodiment in which the adapter interacts with a support structure or frame 10. (partially shown) This frame or support structure 10 (shown fully in FIG. 6) may be attached to the rear of a truck, for example. The truck may be a tractor-trailer or tandem truck with rail gear. In another embodiment, support structure 10 may be attached to the front or rear of a railcar. Support legs 20 are adapted to fit inside support structure 10 (shown in FIG. 4) and can be released in a downward direction. Support legs 20 are preferably beams of a sufficient length and width to transfer loads without bending or breaking. In one embodiment, support legs 20 preferably have two ends; upper and lower ends 30 and 40, respectively. In a preferred embodiment, as shown, for example, in FIG. 9, lower end 40 has a flange 50 about its perimeter. In another embodiment, flange 50 may have one or more apertures for interaction with a locking system 90. In a preferred embodiment of the invention shown in FIG. 6, support structure 10 is preferably an A-frame. A preferred type frame is that associated with the Prentice crane loader model 120-C. In other embodiments, the support structure may be of any type adapted to have one or more extendible legs.

Figure 5:
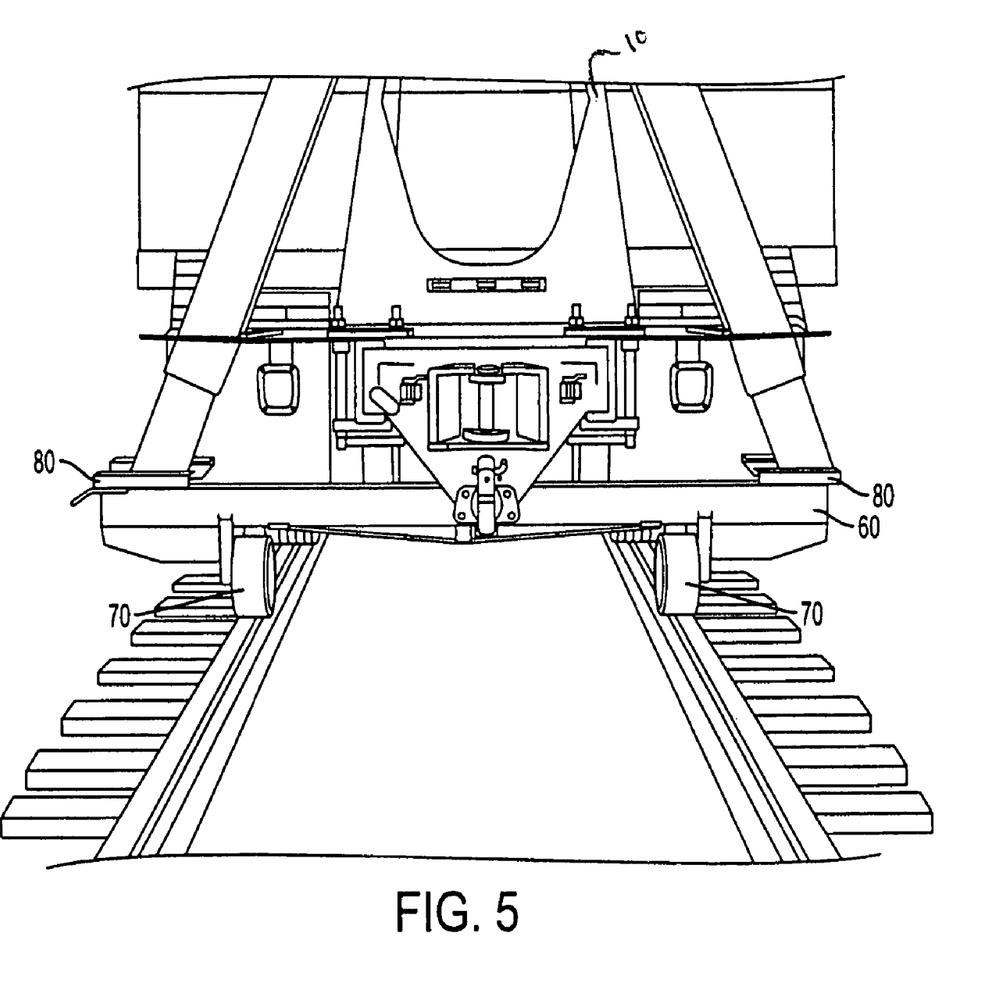
FIG. 5 depicts a rear view of an embodiment of the present invention.

Referring to FIG. 5, load beam 60 is also attached, for example, to the rear of a support structure that is preferably attached to a truck or similar vehicle. In another embodiment, load beam 60 may be attached to the rear or front of a railcar. Load beam 60 preferably is supported by a plurality of wheels 70. Wheels 70 may be adapted to ride on rail, track or, in another embodiment, may be adapted to ride on other surfaces such as gravel, asphalt, or any other ground surface. Wheels may be of varying sizes for different loads or types of track. Wheels 70 may also have grooves or flanges of varying sizes to allow movement on various types of terrain, including rails and/or asphalt, for example. Wheels 70 may be made of any material capable of rolling.

Figure 10:
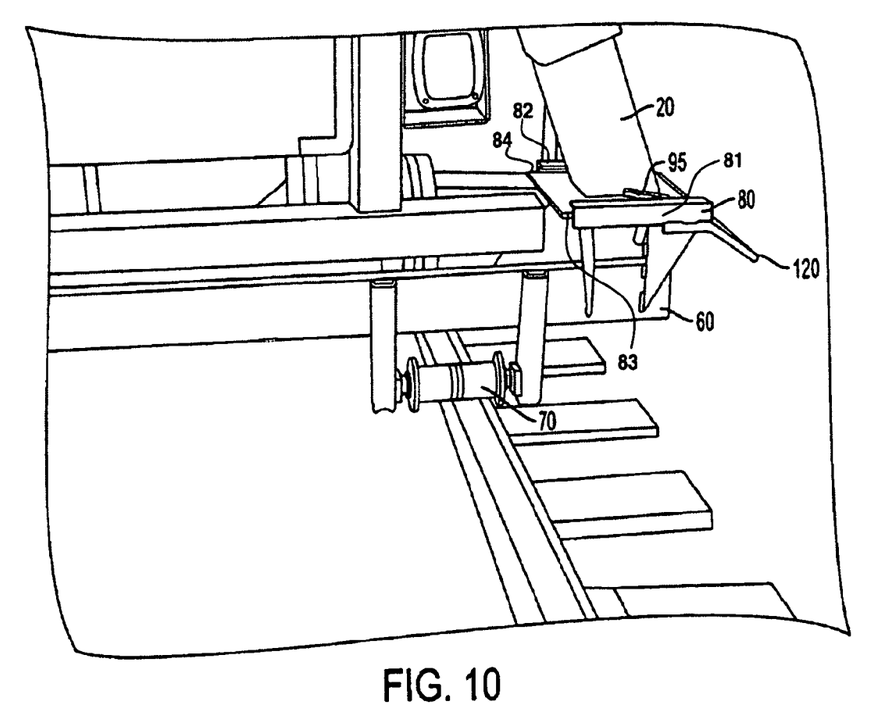
FIG. 10 depicts a close up of a rear view of one embodiment of the present invention in which the rail wheels have rail flanges.

Load beam 60 preferably has a plurality of fit sleeves 80. Fit sleeves 80 may be attached on the top of, the sides of or beneath load beam 60. FIG. 10 is a close up of load beam 60 with fit sleeves 80 attached. In this embodiment, fit sleeves 80 are adapted to slide along load beam 60. In alternative embodiments, fit sleeves 80 may be adapted to rotate about load beam 60.

Fit sleeves 80 may be flat plates with a plurality of grooves as shown in FIG. 10. In alternative embodiments, fit sleeves 80 may be of any shape to contact load beam 60 and support legs 20. Fit sleeves 80 may also have a locking mechanism, such as an aperture, for example, that is used to lock the fit sleeves 80 to support legs 20. In one embodiment, a pin 95 may be inserted through support legs 20 and fit sleeves 80. In another embodiment, other means of securing support legs 20 and fit sleeves 80 may be used, such as a dove-tail configuration.

Figure 6:
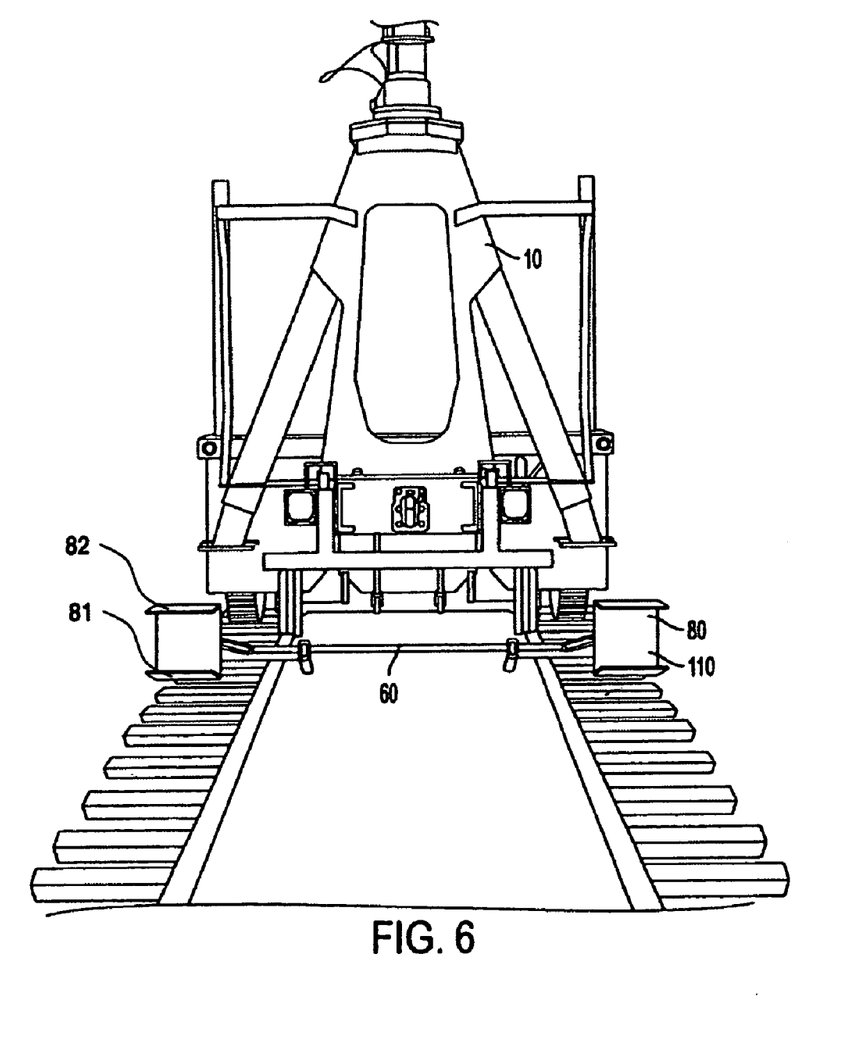
FIG. 6 depicts a rear view of an embodiment of the present invention in which the adapter is placed on the rails before it is attached to the support system.
Figure 7:
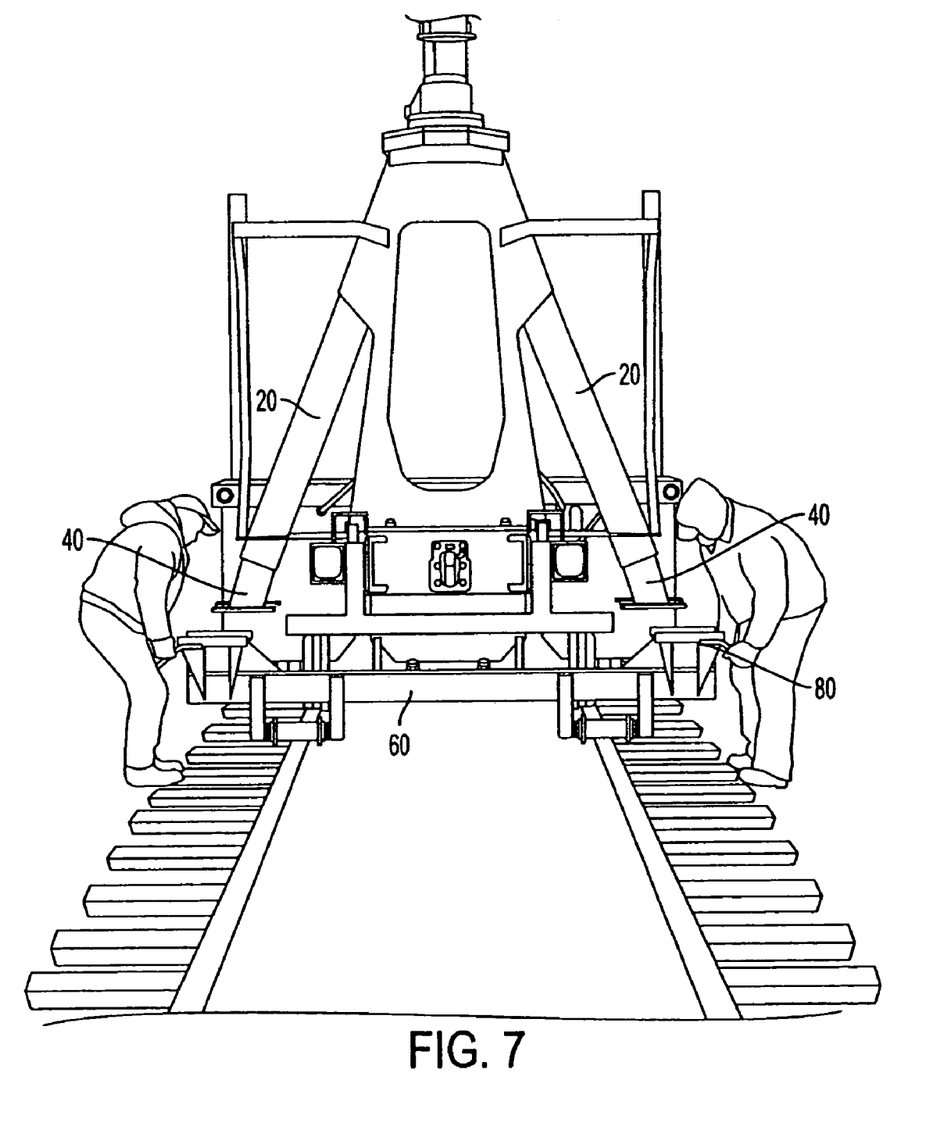
FIG. 7 depicts a rear view of an embodiment of the present invention showing positioning of the adapter in relation to the support system in which adapter fit sleeves are turned upward to receive the support legs.
Figure 8:
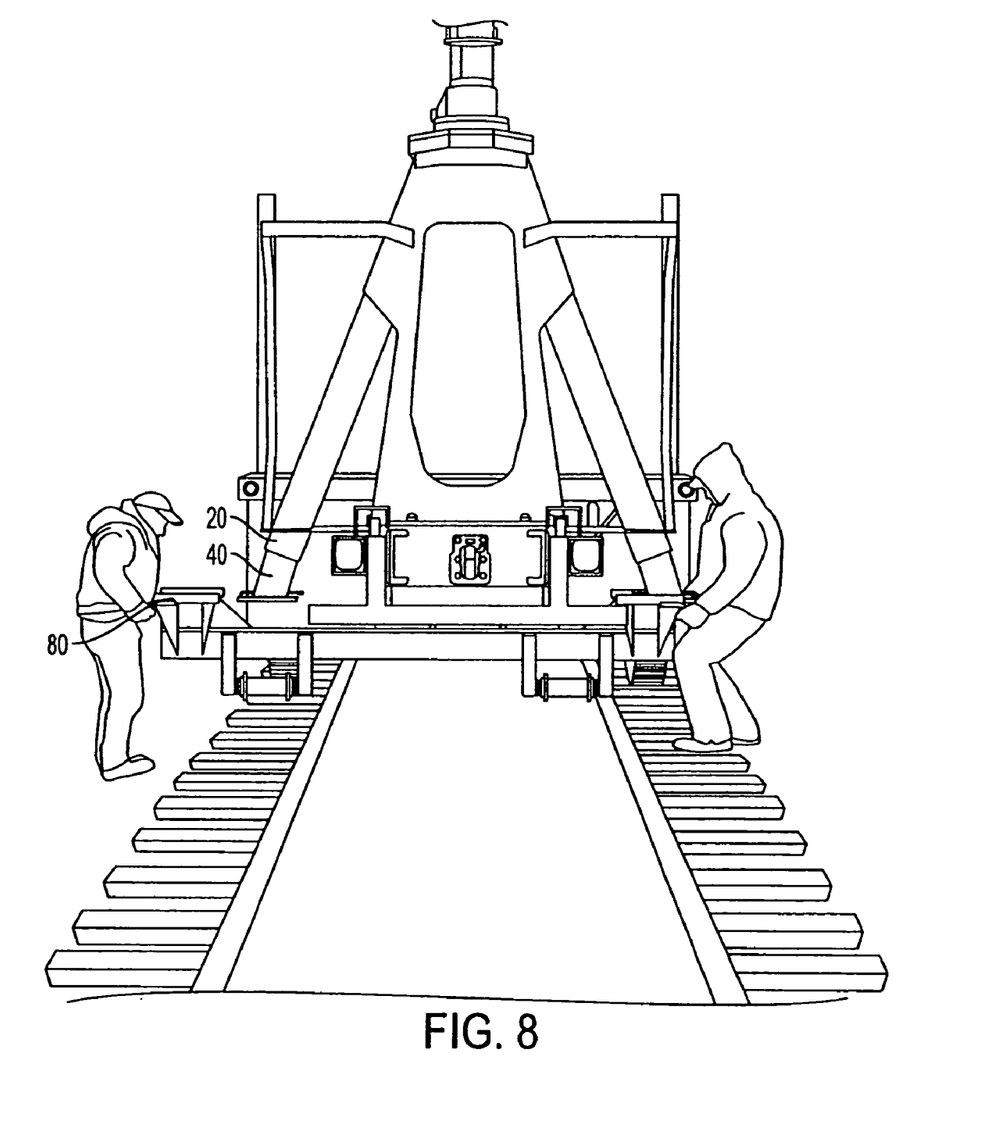
FIG. 8 depicts an embodiment of the present invention showing the support legs extended to connect with the adapter fit sleeves.

FIGS. 6–8 depict the assembly of the present invention to support structure 10. In FIG. 5, load beam 60 has fit sleeves 80 attached before the entire system is attached to support structure 10. In FIG. 7, load beam 60 and corresponding fit sleeves 80 are rotated upward so that the upper face 110 (shown in FIG. 6) of fit sleeve 80 is facing lower end 40 of support legs 20.

Figure 9:
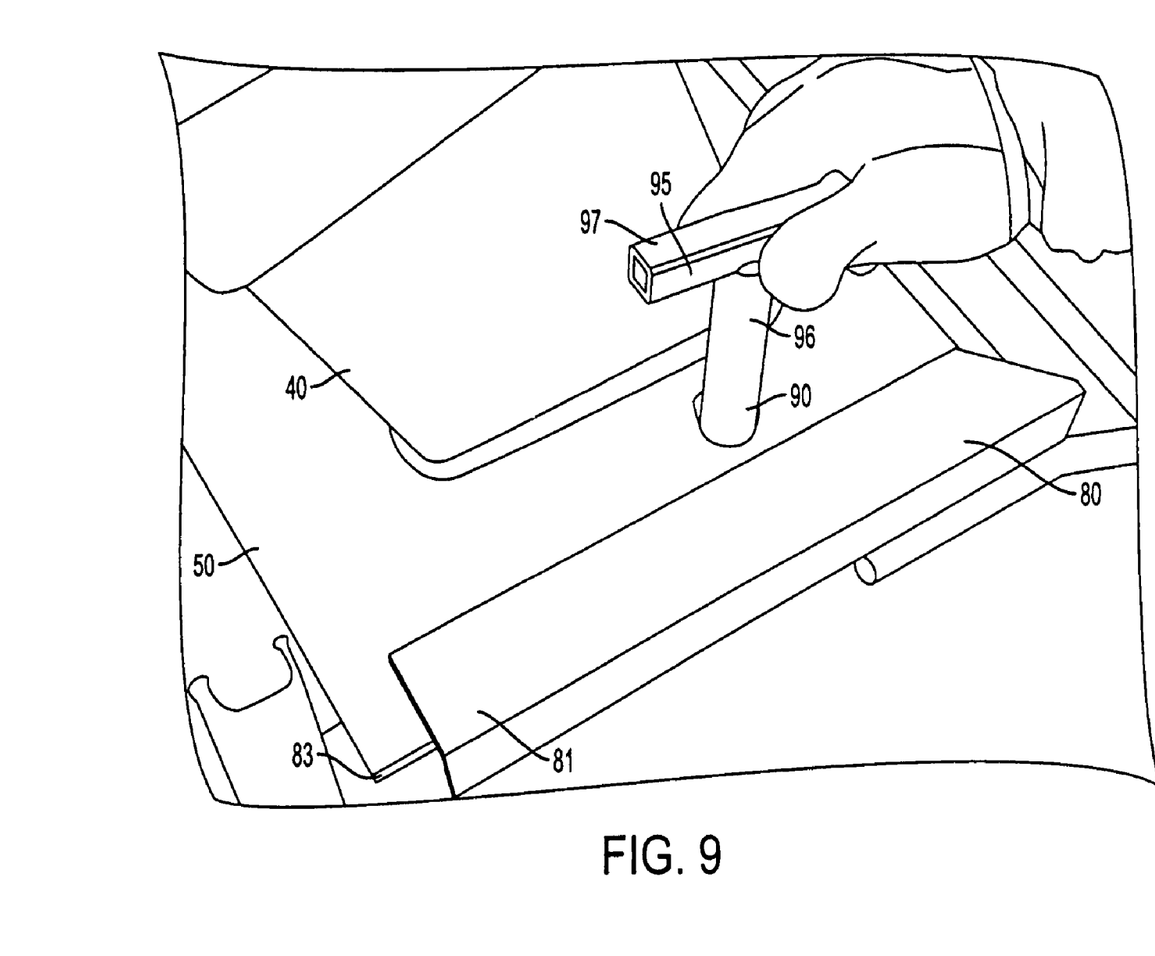
FIG. 9 depicts a top view of an embodiment of the present invention in which a pinion is used to lock an adapter fit sleeve into a desired position.

FIG. 8 shows the positioning of fit sleeves 80 in relation to lower end 40 of support legs 20. In this embodiment, fit sleeves 80 are pushed along load beam 60 towards each other. Fit sleeves 80 are preferably moved until they are directly underneath support legs 20. Referring to FIG. 9, in one embodiment, fit sleeves 80 preferably have channels 81 and 82 (not shown) on their forward and rear faces 83 and 84 (not shown), respectively. In alternative embodiments, channels 81 and 82 may be located on any face. In another embodiment, mechanical equivalents may be used in place of channels 81 and 82. Channels 81 and 82 are preferably adapted to encase flange 50 for proper positioning. After fit sleeves 80 are positioned, they may be locked into place as shown in FIG. 9 with pin 95.

In one embodiment, such as the embodiment depicted in FIG. 9, locking mechanism 90 may comprises a pin 95 and apertures. One aperture is preferably cut or drilled in flange 50 and is of a larger diameter than shaft 96 of pin 95. Another aperture is preferably cut or drilled in fit sleeve 80 and is of a larger diameter than shaft 96 of pin 95. Pin 95 also has a horizontal handle 97 that may be used to grip pin 95. Shaft 96 of pin 95 may be inserted through an aperture in flange 50 and an aperture in fit sleeve 80. In other embodiments, alternative means of locking may be used, such as, for example, a camshaft-type locking system. Such locking systems are preferably designed to prevent support legs from slipping or vibrating out of place under stressors related to load or movement.

FIG. 10 depicts a close up of one side of an embodiment of this invention. Wheels 70 are adapted to be used in conjunction with rail or track. In this embodiment, handle 120 is in place, which may be used for gripping purposes.

Figure 11:
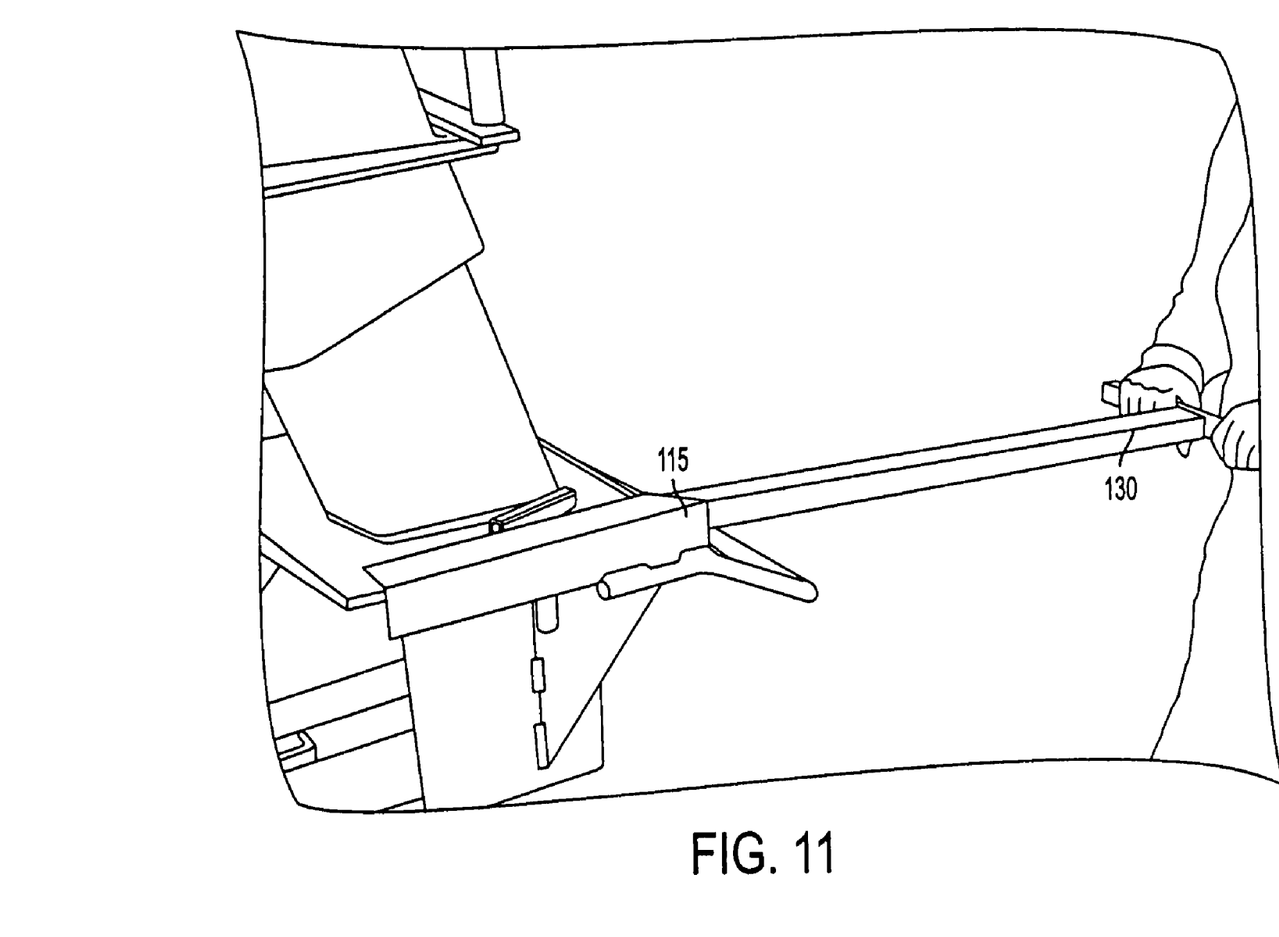
FIG. 11 depicts a close up of an embodiment of the present invention in which a bar and handle configuration is used to lift the adapter in a desired position.
Figure 12:
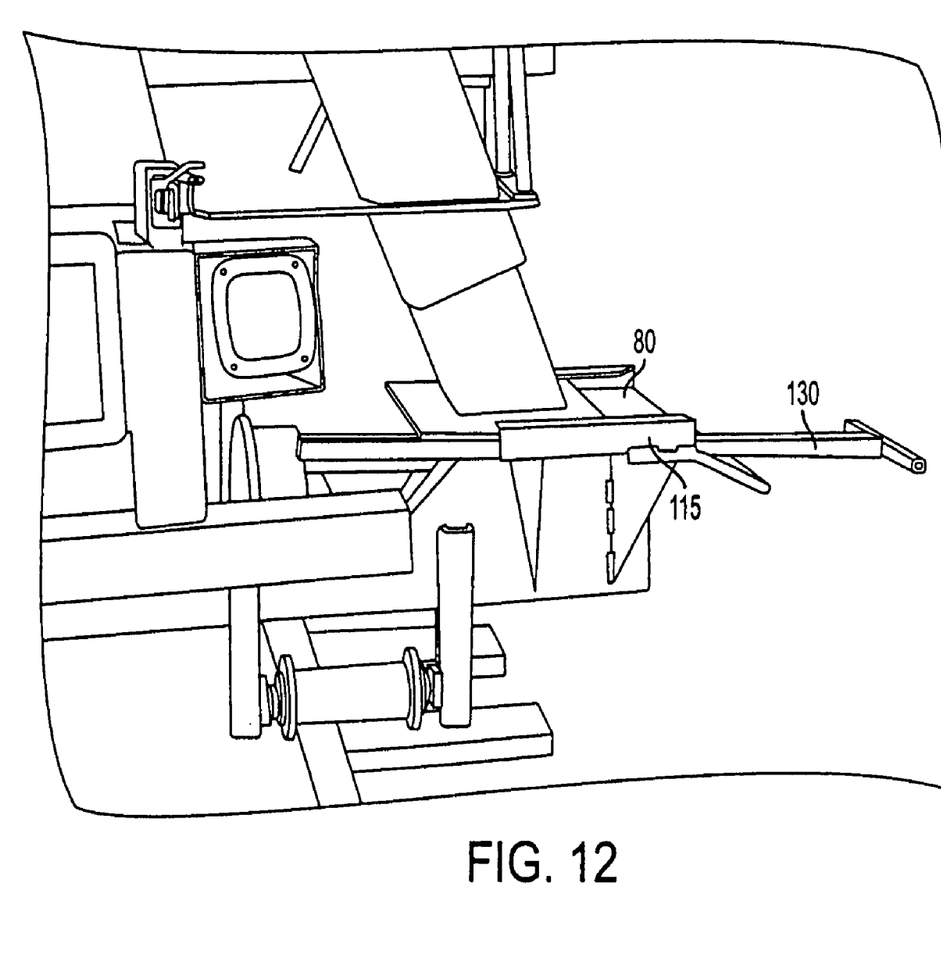
FIG. 12 depicts a close up rear view of an embodiment of the present invention in which a bar and handle configuration is used to lift the load beam into proper position.

In another embodiment of the present invention, such as the system shown in FIG. 11, a lift mechanism may be used. In another embodiment of the present invention, wheels employing rubber tires may be used instead of rail wheels for off-rail uses. The lift mechanism may include a channel 115 connected to a face of each fit sleeve. A channel tool 130, which may be a long metal bar, is used in conjunction with the channel 115. Channel tool 130 is preferably of a shape and diameter that is adapted to fit inside channel 115 to allow lifting of the entire load beam and its associated parts into the proper position. Channel tool 130, for example, may be a long rod with a slide end and a handle end. FIG. 12 shows this same embodiment in a functional position.

Figure 13A:
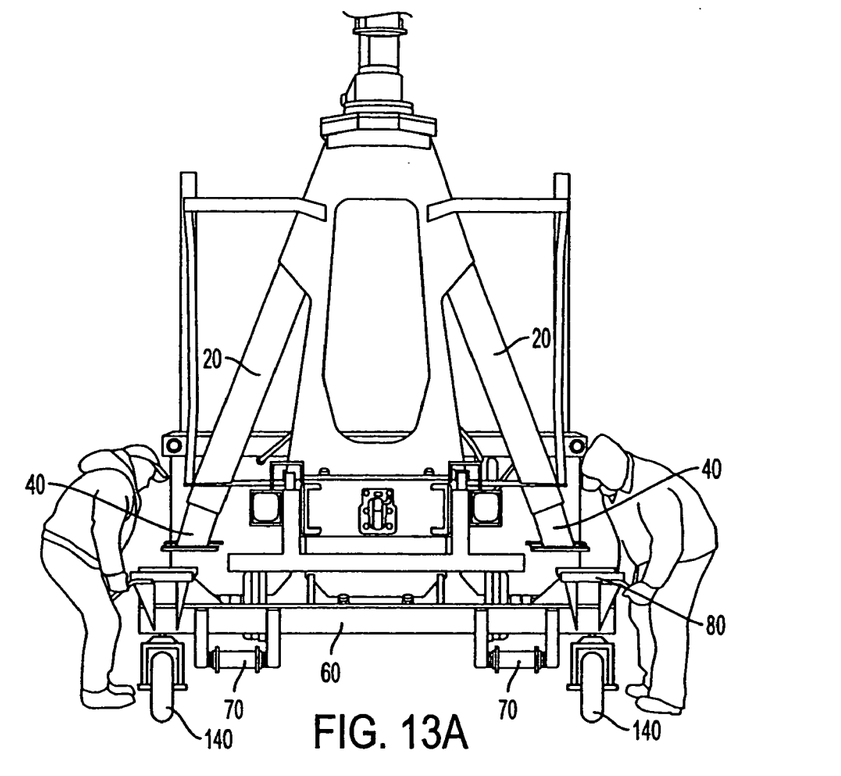
FIG. 13A depicts an embodiment of the present invention in which a detachable tire is attached to the adapter.
Figure 13B:
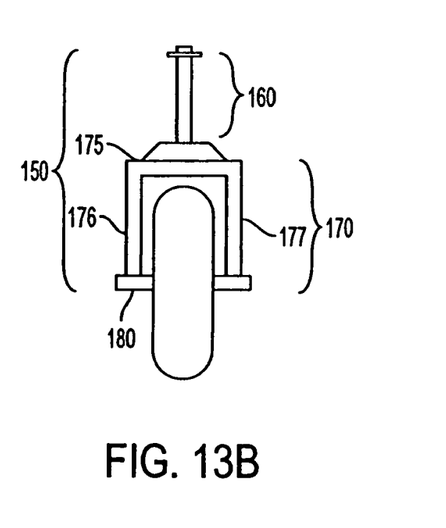
FIG. 13B depicts a front view close up of a tire configuration used with an embodiment of the present invention with a detachable tire.
Figure 13C:
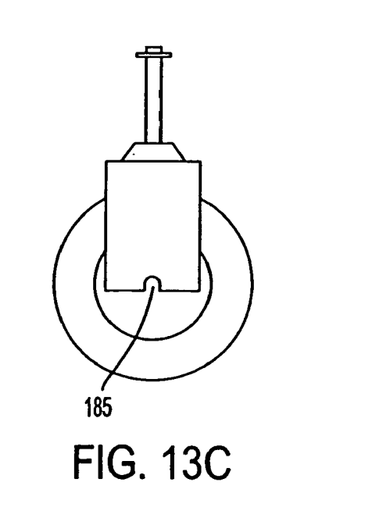
FIG. 13C depicts a side view close up of a tire configuration used with an embodiment of the present invention with a detachable tire.

In another embodiment of the present invention, such as shown in FIGS. 13 A–C, a second set of wheels 140 may be used. Second set of wheels 140 is preferably a set of rubber tires with a greater diameter than wheels 70. Second set of wheels 140 may be adapted to roll on unfinished or rough surfaces. Second set of wheels 140 is preferably attached to the adapter of the present invention via a gooseneck configuration 150. For the purposes of this description only one wheel will be described, as the second set of wheels preferably includes two symmetric wheels. The upper portion 160 of gooseneck 150 is attached to the adapter through load beam 60 underneath fit sleeves 80. Load beam 60 may have an aperture through which gooseneck 150 may be inserted. Gooseneck 150 may be affixed to load beam 60 via a nut, bolt, or similar device. Lower portion 170 of gooseneck 150 comprises a horizontal bar 175 with two vertical bars (176, 177) attached to horizontal bar 175 that extend towards a ground surface. In other embodiments, lower portion 170 may be curved. Axel 180 is connected to vertical bars 176 and 177 and fits through each second wheel 140. This configuration is preferably detachable via inverted forks or slots 185 on the ends of vertical bars 176 and 177 that interact with quick release bolts and levers. In an alternative embodiment, axel 180 may be configured to have a shaft with a threaded portion at a first axle end and a head portion fixed to a second axel end. The axel is preferably in rotatable connection with a nut that secures the axel in an inverted fork 185 of vertical bars 176 and 177. The present embodiment is designed such that the entire invention remains operable in situations where rails are inoperable or nonexistent. Second set of wheels 140 allows the entire invention to remain mobile and capable of handling large loads. Wheels 140 may also be adapted to be steerable by means of rotatable connections to gooseneck 150 and/or forks 185 in addition to or instead of rotatable connections to axel 180.

Figure 14:
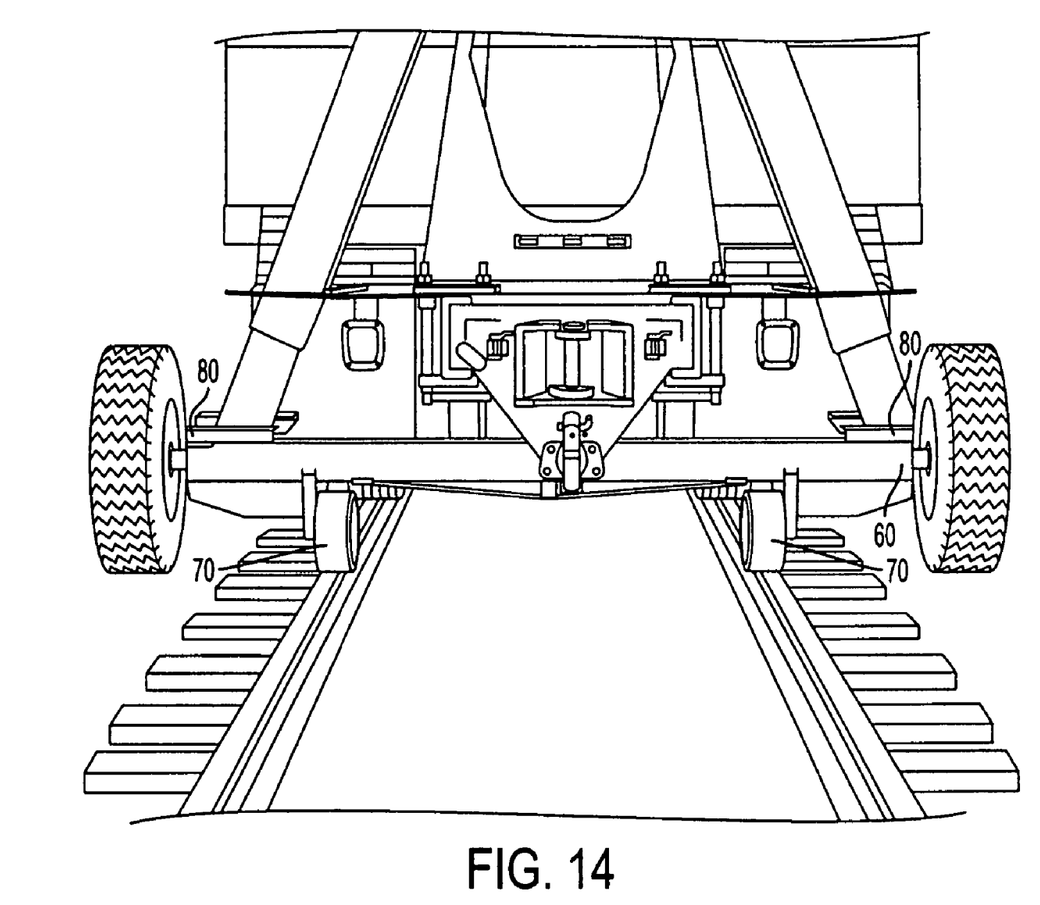
FIG. 14 depicts one embodiment of the present invention in which wheels are attached to the load beam.

In another embodiment of the present invention, wheels employing rubber tires may be used instead of rail wheels for off-rail uses. As shown in FIG. 14, a set of wheels may be placed at the ends of load beam 60. In this embodiment, the wheels are larger, preferably at least automobile-sized, and designed to provide non-rail support for the entire apparatus and associated vehicle. The wheels may also be designed to closely approximate the position of the deployed support legs and maintain the original load distribution while allowing the invention and associated vehicle or railcar to be mobile. This set of wheels may be attached in a manner similar to gooseneck configuration 150, described earlier, or in a method similar to fit sleeves 80, with the exception that the fit sleeve would preferably face the ground. In another embodiment, such as that shown in FIG. 14, the wheels may attach to an axel that extends through load beam 60.

Alternatively, tracks with or without treads may be used in any of the locations described above instead of rubber tires or rail wheels. Such tire-wheeled, or tracked alternatives of the present invention may be preferable for certain road grading or asphalt operations.

Additionally, the present invention is preferably adapted to utilize a hydraulic system. The hydraulic system preferably has a check valve or similar device to provide an additional safety, performance, or stability feature. In this embodiment, if a load greater than or equal to a given value is sensed, the support legs will lock rather than allow hydraulics to further compensate for the load, preventing the vehicle or railcar from tipping over, providing less than optimal performance, or becoming less stable. In this embodiment, the hydraulic system is preferably designed to compensate for small variations on a road or rail system.

All materials used to produce the current invention are preferably rust or corrosion resistant and capable of withstanding heavy loads without bending or breaking. Such materials may include, for example, stainless steel, iron, iron alloys, or other wear resistant alloys.

The invention may also be used in other fields for stabilizing supports or providing a counter-force for loading. Examples of other fields may include, but are not limited to baggage handling, shipping, and maritime uses.

It will be apparent to those skilled in the art that various modifications and variations can be made in the support/stabilization system, apparatus and method of the present invention and its construction without departing from the scope and spirit of the invention. Other embodiments of the invention will be apparent to those skilled in the art from consideration of the specification and practice of the invention disclosed herein. It is intended that the specification and examples be considered as exemplary only of the present invention.

I claim:

1. A stabilizer support system for a railroad system having rails, said stabilizer support system comprising:
    a support structure adapted to support objects above the rails, said support structure having one or more extendable support legs that extend in a downward direction toward the ground, said extendable support legs extending from within said support structure; and
    a elongate load beam extending transversely across the rails, wherein said load beam is separate from said support structure, and releasably receives said extendable support legs of said support structure to support said extendable support legs elevated off of the ground;
wherein said elongate load beam supports said extendable support legs to allow movement in the direction of the rails of the railroad system.

2. The system of claim 1, further comprising at least one fit sleeve, wherein said at least one fit sleeve is connected to said load beam and is adapted to receive said one or more extendable support legs.

3. The system of claim 1, wherein said stabilizer support system is attached to a vehicle.

4. The system of claim 3, wherein said vehicle is selected from the group consisting of a railcar and a truck.

5. The system of claim 2, wherein said at least one fit sleeve further comprises a locking mechanism, wherein said locking mechanism is connected to a top face of said at least one fit sleeve.

6. The system of claim 5, wherein said locking mechanism comprises a pin and aperture.

7. The system of claim 1, further comprising a lift mechanism.

8. The system of claim 7, wherein said lift mechanism further comprises a channel tool and a coordinating channel.

9. The system of claim 3, where said stabilizer support system is adapted to be detachable from said vehicle.

10. The system of claim 1, further comprising one or more wheels attached to said load beam.

11. The system of claim 1, wherein said support structure comprises an A-frame.

12. The system of claim 11, wherein said support structure is attached to the rear of a railcar.

13. The system of claim 11, wherein said support structure is attached to the rear of a truck.

14. The system of claim 2, wherein each of said extendable support legs has an upper and lower end.

15. The system of claim 14, wherein said lower end of said extendable support legs further comprises a flange.

16. The system of claim 15, wherein said flange is adapted to slidably connect with said one or more fit sleeves.

17. The system of claim 10, further comprising a second set of wheels attached to said load beam.

18. The system of claim 10, wherein said wheels comprise rail wheels.

19. The system of claim 10, wherein said wheels comprise tire wheels.

20. The system of claim 17, wherein said second set of wheels comprise rubber tires.

21. The system of claim 17, wherein said second set of wheels has a greater diameter than said one or more wheels.

22. The system of claim 1, further comprising a hydraulic system, wherein said hydraulic system is adapted to compensate for non-uniform surfaces.

23. A method for stabilizing a support system for a railroad system having rails, said method comprising the steps of:
providing an apparatus that extends transversely across the rails said apparatus having one or more fit sleeves;
providing one or more extendable support legs that are separate from said apparatus;
extending said one or more extendable support legs downwardly toward a ground; and
removably resting said extended support legs on said fit sleeves of said apparatus to support said extendable support legs elevated off of the ground;
wherein said apparatus supports said extendable support legs to allow movement in the direction of the rails of the railroad system.

24. A method for stabilizing a support system for a railroad system having rails, said method comprising the steps of;
providing a load beam having one or more fit sleeves, said load beam extending across and outwardly beyond the rails;
rotating said load beam upward;
providing one or more extendable support legs;
sliding said one or more fit sleeves under said one or more extendable support legs; and
removably connecting said one or more fit sleeves to said one or more extendable support legs to support said extendable support legs elevated off of the ground.

25. The method of claim 24, further comprising locking said one or more fit sleeves by providing a locking mechanism comprising one or more of the group consisting of a pin and an aperture.

26. The method of claim 24, wherein said rotating step further comprises lifting said one or more fit sleeves in an upward direction.

27. The method of claim 24, wherein said connecting step further comprises extending said one or more extendable support legs to rest above said one or more fit sleeves.

28. The method of claim 24, wherein said sliding step further comprises sliding a flange of said one or more extendable support legs in a channel in said one or more fit sleeves.

29. The method of claim 25, wherein said locking step further comprises placing a pin through apertures in said fit sleeves and said extendable support legs.

30. The method of claim 25, wherein said locking step further comprises sliding a channel tool through said channel in said one or more fit sleeves.

31. The method of claim 24, wherein said load beam is adapted to be attached to one or more wheels.

32. The method of claim 24, further comprising providing a set of wheels adapted to roll along rails.

33. The method of claim 24, further comprising providing a set of wheels adapted to roll along a ground surface.

34. A method for distributing weight in a support system for a railroad system having rails, said method comprising the steps of:
providing a load beam that extends transversely across and outwardly beyond the rails, said load beam having wheels that contact a ground or the rails;
providing one or more extendable support legs that are separate from said load beam; and
extending said one or more extendable support legs downwardly toward the ground to removably rest upon said load beam so that said extended support legs are supported elevated off of the ground.

35. A railway stabilizer support system for a railroad system having rails, said railway stabilizer support system comprising:
one or more extendible support legs that extend downwardly toward a ground;
a support structure from which said one or more extendable support legs extend, said support structure being adapted to support objects above the rails;
a load beam extending across and outwardly beyond the rails, said load beam including one or more fit sleeves that receive said extendable support legs to support said extendible support legs elevated off of the ground; and
a locking mechanism connected to said one or more fit sleeves that releasably locks said extendable support legs in said fit sleeves.

36. The system of claim 35, wherein said support structure is attached to a vehicle.

37. The system of claim 36, wherein said vehicle is selected from one or more of the group consisting of a railcar, and a truck.

38. The system of claim 35, wherein said one or more fit sleeves further comprise a bar channel on an outer edge of said one or more fit sleeves.

39. The system of claim 35, wherein said locking mechanism further comprises a pin and an aperture that extend through said one or more fit sleeves.

40. The system of claim 38, further comprising a lifting mechanism comprising a bar tool that is adapted to slide through said bar channel.

41. The system of claim 36, wherein said load beam is adapted to be detachable from said vehicle.

42. The system of claim 35, wherein said load beam is supported by one or more wheels that are adapted to roll on a flat surface.

43. The system of claim 35, wherein said support structure comprises an A-frame.

44. The system of claim 35, wherein said support structure is attached to the rear of a railcar.

45. The system of claim 35, wherein said support structure is attached to the rear of a truck.

46. The system of claim 35, wherein each of said one or more extendable support legs has an upper and lower end.

47. The system of claim 46, wherein said lower end of said one or more extendable support legs has a flange.

48. The system of claim 47, wherein said flange is adapted to slidably connect with said one or more fit sleeves.

49. The system of claim 42, further comprising a set of wheels attached to said load beam.

50. The system of claim 49, wherein said set of wheels further comprise rubber tires.

51. The system of claim 49, wherein said set of wheels has a greater diameter than said one or more wheels.

52. A stabilizer support system for a railroad system having rails, said stabilizer support system comprising:
    a support structure adapted to support objects above the rails;
    one or more extendable support legs that extend downwardly from said support structure toward a ground; and
    wheels that contact the ground or the rail to support said extendable support legs elevated off of the ground and outward of the rails, to allow said support structure to be moved in a direction of the rail while being supported.

53. The system of claim 52, wherein said support structure is attached to a vehicle.

54. The system of claim 53, wherein said vehicle is selected from the group consisting of a railcar, and a truck.

55. The system of claim 52, where said wheels are adapted to be detachable from said vehicle.

56. The system of claim 52, wherein said support structure comprises an A-frame.

57. The system of claim 52, wherein each of said extendable support legs has an upper and lower end.

58. The system of claim 57, wherein said lower end of said extendable support legs further comprises a flange.

59. The system of claim 58 wherein said flange is adapted to slidably connect with said wheels.

60. The system of claim 52 wherein said wheels comprise rail wheels.

61. The system of claim 52, wherein said wheels comprise tire wheels.

62. The system of claim 52, further comprising a hydraulic system, wherein said hydraulic system is adapted to compensate for non-uniform surfaces.

63. An apparatus for conveyance further comprising the system of claim 1, 35, or 52.

* * * * *